United States Patent
Wang et al.

(10) Patent No.: US 12,255,323 B2
(45) Date of Patent: Mar. 18, 2025

(54) SILICON OXIDE/CARBON COMPOSITE NEGATIVE ELECTRODE MATERIAL AND PREPARATION METHOD THEREFOR, AND LITHIUM-ION BATTERY

(71) Applicant: BTR NEW MATERIAL GROUP CO., LTD., Guangdong (CN)

(72) Inventors: Jingwei Wang, Guangdong (CN); Chunlei Pang, Guangdong (CN); Tengyu Liang, Guangdong (CN); Jianguo Ren, Guangdong (CN); Min Yue, Guangdong (CN); Xueqin He, Guangdong (CN)

(73) Assignee: BTR NEW MATERIAL GROUP CO., LTD., Guangdong (CN)

( * ) Notice: Subject to any disclaimer, the term of this patent is extended or adjusted under 35 U.S.C. 154(b) by 819 days.

(21) Appl. No.: 17/286,882

(22) PCT Filed: May 15, 2020

(86) PCT No.: PCT/CN2020/090682
§ 371 (c)(1),
(2) Date: Apr. 20, 2021

(87) PCT Pub. No.: WO2020/238658
PCT Pub. Date: Dec. 3, 2020

(65) Prior Publication Data
US 2021/0384500 A1 Dec. 9, 2021

(30) Foreign Application Priority Data

May 28, 2019 (CN) .......................... 201910450180.6

(51) Int. Cl.
*H01M 4/48* (2010.01)
*H01M 4/04* (2006.01)
(Continued)

(52) U.S. Cl.
CPC ......... *H01M 4/483* (2013.01); *H01M 4/0471* (2013.01); *H01M 4/386* (2013.01);
(Continued)

(58) Field of Classification Search
CPC ....... H01M 10/0525; H01M 2004/027; H01M 4/0471; H01M 4/139; H01M 4/1393;
(Continued)

(56) References Cited

U.S. PATENT DOCUMENTS 8,859,147 B2 10/2014 Tanaka et al.
2003/0215711 A1* 11/2003 Aramata ............... H01M 4/625
252/502
(Continued)

FOREIGN PATENT DOCUMENTS

CN 104022257 A 9/2014
CN 105409035 A 3/2016
(Continued)

OTHER PUBLICATIONS

International Search Report for International Application No. PCT/CN2020/090682 mailed Aug. 18, 2020 (6 pages), Including English Translation.
(Continued)

*Primary Examiner* — Victoria H Lynch
(74) *Attorney, Agent, or Firm* — Merchant & Gould P.C.

(57) ABSTRACT

A preparation method obtains silicon oxide/carbon composite negative electrode material and a lithium-ion battery. The silicon oxide/carbon composite negative electrode material is a secondary particle, and mainly consists of a SiOx/C material. The SiOx/C material includes SiOx particles and a carbon layer with which the surfaces of the SiOx particles are coated. The SiOx particles include Si crystallites. The preparation method includes: 1) synthesizing a silicon oxide bulk; 2) performing crushing to obtain micro-level or nano-
(Continued)

level SiOx particles; 3) mixing with a carbon binder; 4) granulating; 5) modification and carbonization; and 6) post-processing.

18 Claims, 4 Drawing Sheets

(51) Int. Cl.
  H01M 4/38      (2006.01)
  H01M 4/583     (2010.01)
  H01M 4/62      (2006.01)
  H01M 10/0525   (2010.01)
  H01M 4/02      (2006.01)

(52) U.S. Cl.
  CPC .......... *H01M 4/583* (2013.01); *H01M 4/621* (2013.01); *H01M 10/0525* (2013.01); *H01M 2004/027* (2013.01)

(58) Field of Classification Search
  CPC .... H01M 4/1395; H01M 4/366; H01M 4/386; H01M 4/483; H01M 4/583; H01M 4/587; H01M 4/62; H01M 4/621; Y02E 60/10
  See application file for complete search history.

(56) References Cited

U.S. PATENT DOCUMENTS

| | | | | |
|---|---|---|---|---|
| 2014/0162129 A1* | 6/2014 | Kim | ............... | H01M 4/625 |
| | | | | 252/506 |
| 2016/0079591 A1* | 3/2016 | Yang | ............... | C04B 35/62839 |
| | | | | 427/122 |
| 2016/0218357 A1* | 7/2016 | Yoshikawa | ........... | H01M 4/382 |
| 2021/0075003 A1* | 3/2021 | Yasuda | ................ | H01M 4/483 |

FOREIGN PATENT DOCUMENTS

| | | |
|---|---|---|
| CN | 105612636 A | 5/2016 |
| CN | 106941169 A | 7/2017 |
| CN | 109037636 A | 12/2018 |
| JP | 201572809 A | 4/2015 |
| JP | 2015144101 A | 8/2015 |
| JP | 2016522139 A | 7/2016 |
| JP | 201710645 A | 1/2017 |
| WO | 2012036127 A1 | 3/2012 |
| WO | 2014172914 A1 | 10/2014 |

OTHER PUBLICATIONS

Written Opinion for International Application No. PCT/CN2020/090682 mailed Aug. 18, 2020 (5 pages).

Japanese Office Action received for JP Application No. 2021-510467 on Aug. 17, 2022, 7 pgs.

* cited by examiner

SILICON OXIDE/CARBON COMPOSITE NEGATIVE ELECTRODE MATERIAL AND PREPARATION METHOD THEREFOR, AND LITHIUM-ION BATTERY

This application is a National Stage Application of PCT/CN2020/090682, filed 15 May 2020, which claims benefit of Serial No. 201910450180.6, filed 28 May 2019 in China and which applications are incorporated herein by reference. To the extent appropriate, a claim of priority is made to each of the above-disclosed applications.

TECHNICAL FIELD

The present disclosure involves the technical field of energy storage, and relates to a battery material, for example, to a silicon oxide (or oxide of silicon)/carbon composite negative electrode material and a preparation method therefor, and a lithium-ion battery.

BACKGROUND ART

Recent years, with the continuous development of 3 C consumption electronic field, electric tools and energy storage equipment, the lithium-ion battery has become the first choice of power supply because of its characteristics such as high capacity, high energy density and excellent charge-discharge cycle. However, with the continuous innovation of science and technology and society, people have higher requirements for the energy storage performance of lithium-ion battery, and the market has urgent needs of higher energy density and longer service life for lithium-ion battery. At present, the actual capacity of commercial graphite negative electrode materials has been developed close to its theoretical capacity of 372 mAh/g, which severely restricts further improvement of the energy density of lithium-ion batteries. Hence, the development of high-capacity and long-cycle negative electrode materials has become a current research focus.

In this situation, in order to improve the overall performance of lithium-ion batteries, researchers have developed many new electrode materials. Among them, the Si negative electrode has attracted much attention due to its extremely high theoretical specific capacity (4200 mAh/g), however, the problem of capacity degradation caused by its huge volume change (300%) has become a main obstacle to its commercial application. Research shows that $SiO_x$ has a relatively high theoretical specific capacity (about 1700 mAh/g) and a low lithium intercalation potential platform, and after the first lithium intercalation, $SiO_x$ will react with Li to form irreversible $Li_2O$, $Li_4SiO_4$ and reversible $Li_2Si_2O_5$ and Si, while the irreversible $Li_2O$ and $Li_4SiO_4$ can be used as an inert phase to relieve and absorb the volume expansion of Si, and therefore can effectively improve the performance of the Si negative electrode, and is currently an ideal substitute for carbon negative electrode in the lithium battery. However, there are still some problems in using $SiO_x$ as a negative electrode material: 1) poor conductivity; and 2) large volume change (~200%) and easy pulverization of material during the cycle, which results in poor cycle performance of the battery and limits its commercial application.

In view of above disadvantages of $SiO_x$, researchers have tried a lot, for example, $SiO_x$ and carbon materials are composed to improve the conductivity and cycle performance of the $SiO_x$ material.

A method for preparing a $SiO_x$ composite material for lithium-ion battery comprises: crushing $SiO_x$ blocks (0.85<x<1.15) to obtain $SiO_x$ powder with a median particle size of 2-15 um, mixing it with an organic carbon source, coating and placing in a vacuum kneader, heating for melting and kneading, then compressing to obtain a sheet precursor I with a thickness of 2-5 mm; smashing the precursor I and placing it in a protection atmosphere furnace for carbonization, and then fusing it with a carbon nanomaterial to obtain a $SiO_x$ composite material for lithium-ion battery. The material obtained has a relatively high capacity and good cycle performance, however, in this method the size of $SiO_x$ particles in the prepared $SiO_x$/C composite material is relatively large, and the carbon coating on the surface thereof can still crack due to volume expansion during the material cycle process, which renders direct contact between the material and the electrolyte, and thereby results in attenuation of capacity and poor cycle performance.

Another $SiO_x$/C composite negative electrode material with a core-shell structure includes the following preparing processes: vapor depositing an amorphous conductive carbon layer on the surface of $SiO_x$ particles with a median particle size of 100-500 nm, to form silicon-carbon composite particles with $SiO_x$ particles covered by the amorphous conductive carbon layer, then dispersing them in an organic solvent dissolved with a mixture of asphalt, polymer materials and the like; mixing, spray drying and then performing high-temperature carbonization, thereby obtaining the silicon oxide/carbon composite negative electrode material with a core-shell structure. The composite negative electrode material has excellent electrical conductivity and a relatively stable structure, however, the $SiO_x$ used in the composite negative electrode material obtained according to the method are particles of about 500 nm, during preparation the materials can be easily oxidized, which results in a relatively large irreversible capacity and a low first efficiency of the composite material; moreover, sintering is conducted, a large number of porous structures are formed inside and collapsed due to volume expansion during the cycle of the materials, which renders a direct contact between the material and the electrolyte, and thereby resulting in capacity attenuation and poor cycle performance.

There is another lithium-ion battery, with a silicon carbon negative electrode material therefor and a preparation method thereof. The silicon-carbon negative electrode material is obtained by kneading and mixing a slurry containing nano-silicon powder or nano-$SiO_x$ powder with a micron-level graphite powder and a coal tar soft asphalt, coking, crushing and then performing surface chemical vapor deposition. According to the method, nano-silicon/$SiO_x$ particles are firstly dispersed and fixed in graphite particles by the asphalt carbon, and then vapor deposited carbon is used to protect the surface of part of the exposed silicon particles. However, the cycle performance, rate performance and discharge capacity of the product obtained according to the method need to be further improved.

Therefore, the development of a $SiO_x$/C composite negative electrode material with excellent rate performance and cycle stability is technically difficult in the field of lithium-ion battery.

SUMMARY

The following is a summary of the subject detailed in the present disclosure. The summary is not intended to limit the protection scope of the claims.

A purpose of the present disclosure is to provide a silicon oxide/carbon composite negative electrode material and a preparation method therefor, and a lithium-ion battery. The silicon oxide/carbon composite negative electrode material provided by the present disclosure has high capacity and first coulomb efficiency and excellent rate performance and cycle stability.

In order to achieve the above purpose, the present disclosure adopts the following technical solutions.

In a first aspect, the present disclosure provides a silicon oxide/carbon composite negative electrode material, wherein the silicon oxide/carbon composite negative electrode material is secondary particles, mainly composed of a $SiO_x/C$ material. The $SiO_x/C$ material comprises $SiO_x$ particles and a carbon layer coated on the surface of the $SiO_x$ particles. The $SiO_x$ particles comprise Si microcrystals.

In the silicon oxide/carbon composite negative electrode material provided in the present disclosure, the secondary particles are mainly composed of the $SiO_x/C$ material. The carbon layer in the $SiO_x/C$ material has not only the function of coating the surface of the $SiO_x$ particles, but also the function of connecting the $SiO_x/C$ material to constitute the secondary particles.

The silicon oxide/carbon composite negative electrode material provided in the present disclosure is in a unique structure, so that it has good electrochemical performance. The silicon oxide/carbon composite negative electrode material is a secondary particle, and its internal porous structure can absorb a part of the volume expansion to synergistically improve the cycle performance of the material; in addition, the carbon filled among the $SiO_x$ particles can provide good electrical contact among the particles, which reduces direct contact between the electrolyte and active substances and thus avoids the cycle degradation caused by loss of electrical contact between the active substances when the particles are powdered.

In the silicon oxide/carbon composite negative electrode material provided in the present disclosure, the $SiO_x$ particles comprise Si microcrystals. Such a structure is also very helpful for improving the performance of the silicon oxide/carbon composite negative electrode material.

The following description is optional technical solutions of the present disclosure, while is not intended to limit the technical solutions provided by the present disclosure, and the technical purpose and advantageous effect of the present disclosure can be bettered achieved through following optional technical solutions.

As an optional technical solution of the present disclosure, in the $SiO_x$ particles, $0.9 \leq x \leq 1.2$, such as 0.9, 1, 1.1, or 1.2, which is not limited to the listed numeric value, and other unlisted values within the range are also applicable.

Optionally, the volume of the $SiO_x$ particles whose particle size is below 1.0 μm accounts for 25%~60% of the total volume of the $SiO_x$ particles, for example, 25%, 30%, 35%, 40%, 45%, 50%, 55% or 60%, and the like, which is not limited to the listed numeric value, and other unlisted values within the range are also applicable. The range of 25%~60% is selected because such range helps more in developing the dynamic advantage of micro- and nano-level $SiO_x$ materials in nano-level materials and the advantage of thermodynamic stability of micron-level materials. If the ratio of the volume of $SiO_x$ particles with a particle size below 1.0 μm to the total volume of $SiO_x$ particles is too small, deterioration of cycle performance and rate performance can be rendered. If the volume of $SiO_x$ particles with a particle size below 1.0 μm accounts for an excessively large ratio to the total volume of the $SiO_x$ particles, more side reactions can occur, which will lead to a reduction of the first efficiency of capacity, and the high-temperature storage performance can also be degraded.

Optionally, the D50 of the $SiO_x$ particles is 0.5 μm<D50<3.0 μm, such as 0.51 μm, 0.75 μm, 1.0 μm, 1.5 μm, 2.0 μm, 2.5 μm or 2.9 μm, and D90<10 μm, such as 9.9 μm, 8 μm, 7 μm, and 6 μm. In the present disclosure, the particle size of the $SiO_x$ particles plays a key role in the electrochemical performance of the silicon oxide/carbon composite negative electrode material. If the D50 of the $SiO_x$ particles is too small, the material has a relatively large specific surface area and will produce a large proportion of $SiO_2$ on the surface of the particles, and then loss of battery capacity is rendered when it is used as a negative electrode material. In addition, a too large specific surface area will cause uneven distribution of a carbonaceous binder during the granulation process, poor conductivity among particles, and will further affect capacity of the material; and a too large D50 of the $SiO_x$ particles will lead to poor granulation effect and poor electrical contact among the particles, and in the charge-discharge process, large particles will easily result in the circumstance that the particles are broken due to the internal stress of lithium intercalation/deintercalation and the active substance is naked, thereby degrading the cycle performance; if the D90 of the $SiO_x$ particles is too large, the particles can become impurities when they are coated as electrodes, which renders degraded battery performance. In the present disclosure, the relative volume expansion of the micro- and nano-level $SiO_x$ particles is small in the charge-discharge process, and then the cycle degradation can be alleviated caused by breaking and pulverizing the particles due to its volume expansion.

Optionally, the D50 of the $SiO_x/C$ material is 2-10 times of the D50 of the $SiO_x$ particles, for example, 2 times, 2.3 times, 3 times, 3.5 times, 4 times, 5 times, 6 times, 7 times, 8 times, 9 times or 10 times, and is not limited to the listed values, and other unlisted values within the range are also applicable, and optionally, it can be 2-5 times. If the D50 of the $SiO_x/C$ material is relatively small and less than 2 times the D50 of the $SiO_x$ particles, it means that the granulation effect of the material is poor, the specific surface area of the micro- and nano-level $SiO_x$ particles cannot be effectively reduced by the granulation process, and the electrical contact among the $SiO_x$ particles is also poor, which thus leads to the reduction of the first efficiency of the capacity and the deterioration of long-term cycle; if the D50 of the $SiO_x/C$ material is relatively large and more than 5 times of the D50 of the $SiO_x$ particles, it means that the distribution of carbon is relatively uneven, which renders the functional groups and defects on the $SiO_x$ surface to be exposed, and the electrolyte can still penetrate the coating layer to contact the $SiO_x$ surface during charge-discharge, which renders poor battery cycle life and high temperature performance, and serious battery gas production. On the other hand, larger particles can become impurities during coating, which reduces the capacity of the material and further degrades the battery performance.

Optionally, the grain size of the Si microcrystals is 1.0~10.0 nm, for example, 10 nm, 9 nm, 8 nm, 7 nm, 6 nm, 5 nm, 4 nm, 3 nm, 2 nm or 1 nm, and is not limited to the listed values, and other unlisted values within the range are also applicable, and optically, it can be 3.0~10.0 nm. If the grain size of Si microcrystals is <3 nm, it will render a low capacity of the lithium intercalation reaction and a low first efficiency. If the size of the Si microcrystals is >10 nm, large particle expansion and contraction in the charge-discharge process will render degradation of the cycle performance.

Therefore, the size of the silicon microcrystals within a suitable range can achieve a relatively high first efficiency and capacity retention ratio.

Optionally, the Si microcrystals are uniformly dispersed in the $SiO_x$ particles.

Optionally, in the silicon oxide/carbon composite negative electrode material, the mass fraction of carbon is 3~15 wt %, for example, 3 wt %, 5 wt %, 8 wt %, 10 wt %, 12 wt %, or 15 wt %, and is not limited to the listed value, and other unlisted values within the range are also applicable. If the mass fraction of carbon is too low, the surface carbon coverage rate and the internal carbon filling rate of the secondary particles could not provide satisfactory electrical conductivity and granulation effect, and thus the cycle performance is degraded when it is used as a negative electrode material. If the mass fraction of carbon is too high, too much carbon cannot achieve further performance improvement, and the charge-discharge capacity can be decreased due to the low capacity of the carbonaceous material itself. In addition, too much carbonaceous binder will render local excessive bonded particles and thus form large secondary particles, which affects the processing performance of the material.

As an optional technical solution of the present disclosure, in the silicon oxide/carbon composite negative electrode material, the $SiO_x$ particles are oriented randomly to each other.

Optionally, the silicon oxide/carbon composite negative electrode material has a porosity of 1~25%, such as 1%, 5%, 10%, 15%, 20%, or 25%, while is not limited to the listed numeric values, and other unlisted values within the range are also applicable, and optionally, it can be 2~15%.

Optionally, the silicon oxide/carbon composite negative electrode material has a specific surface area of 1.0~10.0 $m^2/g$, such as 1.0 $m^2/g$, 2.0 $m^2/g$, 3.0 $m^2/g$, 4.0 $m^2/g$, 5.0 $m^2/g$, 6.0 $m^2/g$, 7.0 $m^2/g$, 8.0 $m^2/g$, 9.0 $m^2/g$ or 10.0 $m^2/g$, while is not limited to the listed values, and other unlisted values within the range are also applicable.

Optionally, the silicon oxide/carbon composite negative electrode material has a D50 of 2.0~45.0 µm, for example, 2.0 µm, 5.0 µm, 10.0 µm, 15.0 µm, 20.0 µm, 25.0 µm, 30.0 µm, 35.0 µm, 40.0 µm or 45.0 µm, while is not limited to the listed values, and other unlisted values within the range are also applicable, and optionally, it can be 2.0~25.0 µm, and further, it can be 2.0~10.0 µm. If the D50 of the $SiO_x/C$ composite negative electrode material is too small, it will cause more interface reactions and increase the irreversible capacity, and thereby reduces the first efficiency of the material. If the D50 of the $SiO_x/C$ composite negative electrode material is too large, it will lead to poor electrical contact among the secondary particles, and poor processing performance when it is coated as a pole piece of the negative electrode material, and thereby degrades the cycle performance.

Optionally, the silicon oxide/carbon composite negative electrode material has a compacted density of 1.0~2.0 $g/cm^3$, for example 1.0 $g/cm^3$, 1.2 $g/cm^3$, 1.4 $g/cm^3$, 1.5 $g/cm^3$, 1.6 $g/cm^3$, 1.8 $g/cm^3$ or 2.0 $g/cm^3$, while is not limited to the listed value, and other unlisted values within the range are also applicable, and optionally, it can be 1.0~1.5 $g/cm^3$.

In the present disclosure, a CuKα radiation source XRD is used to determine the crystal structure of the silicon oxide/carbon composite negative electrode material, and a Si(111) characteristic peak exists correspondingly close to 2θ≈28°, and the grain size of Si(111) crystal face is between 3.0~10.0 nm; and an amorphous $SiO_2$ characteristic peak exists correspondingly within 2θ=15°~25°, and the intensity ratio between the characteristic peak of Si(111) to the amorphous $SiO_2$ characteristic peak is $0.5 < I(Si)/I(SiO_2) < 4$.

On a second aspect, the preset disclosure provides a preparation method for the silicon oxide/carbon composite negative electrode material according to the first aspect, as shown in FIG. 6, the method comprises the following steps:

(1) compounding a silicon oxide;

(2) crushing the silicon oxide in step (1) to obtain micro- and nano-level $SiO_x$ particles;

(3) mixing the micro- and nano-level $SiO_x$ particles in step (2) with a carbonaceous binder to obtain a precursor I;

(4) under a non-oxidizing atmosphere, granulating the precursor I in step (3) to obtain a precursor II;

(5) under a non-oxidizing atmosphere, modifying and carbonizing the precursor II in step (4) to obtain a precursor III; and (6) conducting post-processing to the precursor III in step (5) to obtain the silicon oxide/carbon composite negative electrode material.

In the preparation method provided by the present disclosure, the micro- and nano-level $SiO_x$ powder is mixed and coated with the carbonaceous binder, the carbon material is uniformly and tightly filled among the micro- and nano-level $SiO_x$ particles, and the $SiO_x$ is granulated while coated with carbon, and thus the silicon oxide/carbon composite negative electrode material with good first efficiency of capacity and excellent rate performance and cycle stability is obtained.

In the preparation method provided by the present disclosure, the silicon oxide is firstly prepared in step (1); in step (2) the above silicon oxide in block is crushed into micro- and nano-level $SiO_x$ particles with an appropriate particle size, wherein the micro- and nano-level $SiO_x$ particles are the $SiO_x$ particles in the silicon oxide/carbon composite negative electrode material as described in the first aspect. Therefore, the more the particle size distribution conforms to the optional particle size of the $SiO_x$ particles of the first aspect, the more helpful it is to the improvement of the electrochemical performance of the final product.

The purpose of modification and carbonization in step (5) is that some organic gases volatilize during the carbonization process of the carbonaceous binder, then a microporous structure is formed inside the composite material, and thus the liquid absorption performance of the composite material is improved and then the electrochemical performance of the material is improved.

As an optional technical solution of the present disclosure, the chemical formula of the silicon oxide blocks in step (1) is $SiO_y$, where 0.9≤y<1.1, such as 0.9, 0.95, 1.0, or 1.09.

Optionally, the method for compounding the silicon oxide in step (1) comprises: heating a mixture of metal silicon and silicon dioxide under a protective gas, and after sufficient reaction, condensing and depositing the resultant to obtain the silicon oxide. Reaction occurs after heating, and a silicon oxide gas is generated, and a solid silicon oxide is obtained after the gas is condensed and deposited. In some embodiments, the silicon oxide blocks are obtained through condensation and deposition.

Optionally, the protective gas comprises any one of or the combination of at least two of nitrogen, helium, neon, argon, krypton, or xenon.

Optionally, the heating temperature is 1000-1500° C., such as 1000° C., 1100° C., 1200° C., 1300° C., 1400° C. or 1500° C., while is not limited to the listed values, and other unlisted values within the range are also applicable.

Optionally, the heating is performed under a pressure of 0.1~100 Pa, such as 0.1 Pa, 0.5 Pa, 1 Pa, 5 Pa, 10 Pa, 20 Pa, 50 Pa, 75 Pa, or 100 Pa, while it is not limited to the listed values, and other unlisted values within the range are also applicable, and optionally, it can be 0.1~50 Pa.

Optionally, in the mixture of metal silicon and silicon dioxide, the molar ratio of metal silicon to silicon dioxide is 1:3~5:1, for example, 1:3, 1:2, 1:1, 2:1, 3:1, 4:1 or 5:1, while is not limited to the listed numeric values, and other unlisted values within the range are also applicable.

As an optional technical solution of the present disclosure, the crushing method in step (2) is any one of or the combination of at least two of pulverizing, ball milling, or grading.

Optionally, the crushing equipment comprises any one of or the combination of at least two of a planetary ball mill, a roller mill, a mechanical crusher, a horizontal ball mill, an ultra-low temperature crusher, or a jet crusher.

Optionally, the grading equipment comprises any one of or the combination of at least two of a split-flow ultrafine powder air classifier, a multi-stage air classifier, or a counter-flow air classifier.

Optionally, in the micro- and nano-level $SiO_x$ particles in step (2), $0.9 \le x \le 1.2$, such as 0.9, 1, 1.1 or 1.2, while it is not limited to the listed numeric values, and other unlisted values within the range are also applicable.

Optionally, the volume of the micro- and nano-level $SiO_x$ particles whose particle size is below 1.0 μm accounts for 25%~60% of the total volume of the micro- and nano-level $SiO_x$ particles, such as 25%, 30%, 35%, 40%, 45%, 50%, 55% or 60%, while is not limited to the listed numeric value, and other unlisted values within the range are also applicable.

Optionally, the micro- and nano-level $SiO_x$ in step (2) has a D50 of 0.5 μm<D50<3.0 μm, for example, 0.51 μm, 0.75 μm, 1.0 μm, 1.5 μm, 2.0 μm, 2.5 μm or 2.9 μm, and D90<10 μm, for example, 9.9 μm, 8 μm, 7 μm, 6 μm.

As an optional technical solution of the present disclosure, the carbonaceous binder in step (3) comprises any one of or the combination of at least two of sugars, esters, hydrocarbons, organic acids, or high molecular polymers.

Optionally, the carbonaceous binder in step (3) comprises any one of or the combination of at least two of polyvinyl chloride, polyvinyl butyral, polyacrylonitrile, polyacrylic acid, polyethylene glycol, polypyrrole, polyaniline, sucrose, glucose, maltose, citric acid, asphalt, furfural resin, epoxy resin or phenol resin.

Optionally, in step (3), the mass ratio of the carbonaceous binder to the micro- and nano-level $SiO_x$ material is 5:95~30:70, for example, 5:95, 10:90, 15:85, 20:80, 25:75 or 30:70, while is not limited to the listed values, and other unlisted values within the range are also applicable.

Optionally, in step (3), the mixing equipment comprises any one of or the combination of two of a V-shaped mixer, an electrically heating helical ribbon agitator tank, a high-speed dispersion reactor, a high-speed fusion machine, a high-energy ball mill, a two-dimensional mixer, a three-dimensional mixer, a double cone mixer, a trough mixer or a helical ribbon mixer.

Optionally, the non-oxidizing atmosphere in step (4) comprises any one of or the combination of at least two of nitrogen atmosphere, helium atmosphere, neon atmosphere, argon atmosphere, krypton atmosphere, xenon atmosphere or hydrogen atmosphere, and any one of or the combination of at least two of nitrogen atmosphere, helium atmosphere, argon atmosphere or hydrogen atmosphere can be selected.

Optionally, the non-oxidizing atmosphere in step (4) has a gas flow rate of 10~100.0 L/min, for example, 10 L/min, 20 L/min, 30 L/min, 40 L/min, 50 L/min, 60 L/min, 70 L/min, 80 L/min, 90 L/min or 100 L/min, but it is not limited to the listed values, and other unlisted values within the range are also applicable, and 30~100 L/min can be selected.

Optionally, in step (4), the granulating method comprises any one of or the combination of at least two of spray drying, solid phase kneading, horizontal mixing and heating, double helical ribbon mixing and heating, treating by high temperature and high pressure reactor, mixed rolling, conical heating for reactor, fusion molding, isostatic pressing or carbonizing.

Optionally, the granulating temperature in step (4) is 100~1000° C., for example, 100° C., 200° C., 400° C., 600° C., 800° C., or 1000° C., while is not limited to the listed values, and other unlisted values within the range are also applicable, and optionally, it can be 200~900° C.

Optionally, the heating rate of the granulating in step (4) is 0.5~10° C./min, for example, 0.5° C./min, 1° C./min, 2° C./min, 4° C./min, 6° C./min, 8° C./min or 10° C./min, while is not limited to the listed numeric values, and other unlisted values within the range are also applicable.

As an optional technical solution of the present disclosure, in step (5), the non-oxidizing atmosphere comprises any one of or the combination of at least two of nitrogen atmosphere, helium atmosphere, neon atmosphere, argon atmosphere, krypton atmosphere, xenon atmosphere or hydrogen atmosphere, and optionally, it can be any one of or the combination of at least two of nitrogen atmosphere, helium atmosphere, argon atmosphere or hydrogen atmosphere;

optionally, the non-oxidizing atmosphere in step (5) has a gas flow rate of 10~100.0 L/min, for example, 10 L/min, 20 L/min, 30 L/min, 40 L/min, 50 L/min, 60 L/min, 70 L/min, 80 L/min, 90 L/min or 100 L/min, while it is not limited to the listed numeric values, and other unlisted values within the range are also applicable, and optionally, it can be 30~100 L/min.

Optionally, in step (5), the modification and carbonization are carried out in any one of roller kiln, box furnace, rotary kiln, pusher kiln or tube furnace.

Optionally, the temperature of the modification and carbonization in step (5) is 700~1500° C., for example 700° C., 900° C., 1100° C., 1300° C., or 1500° C., while is not limited to the listed numeric values, and other unlisted values within the range are also applicable.

Optionally, the modification and carbonization in step (5) has a heating rate of 1.0~15° C./min, for example, 1° C./min, 3° C./min, 5° C./min, 7° C./min, 9° C./min, 10° C./min, 11° C./min, 13° C./min or 15° C./min, while it is not limited to the listed numeric values, and other unlisted values within the range are also applicable.

Optionally, the duration for the modification and carbonization in step (5) is 2~6 h, such as 2 h, 3 h, 4 h, 5 h or 6 h, while is not limited to the listed numeric values, and other unlisted values within the range are also applicable.

Optionally, in step (6), the post-processing comprises screening, demagnetizing and drying.

As a further optional technical solution of the preparation method of the present disclosure, the method comprises the following steps:

(1) under a protective gas atmosphere, heating the mixture of metal silicon and silicon dioxide at a pressure of 0.1~50 Pa at 1000-1500° C. to generate a silicon oxide gas, and then condensing and depositing to obtain the silicon oxide blocks, wherein the chemical formula of the silicon oxide blocks is $SiO_y$, wherein $0.9 \leq y < 1.1$, and in the mixture of the metal silicon and the silicon dioxide, the molar ratio of the metal silicon to the silicon dioxide is 1:3~5:1;

(2) crushing the silicon oxide blocks in step (1) to obtain micro- and nano-level $SiO_x$ particles, wherein $0.9 \leq x \leq 1.2$; the volume of the micro- and nano-level $SiO_x$ particles whose particle size is below 1.0 μm accounts for 25%~60% of the total volume of the micro- and nano-level $SiO_x$ particles, and the D50 of the micro- and nano-level $SiO_x$ particles is 0.5 μm<D50<3.0 μm, D90<10 μm;

(3) mixing the micro- and nano-level $SiO_x$ particles in step (2) with a carbonaceous binder to obtain a precursor I, wherein the mass ratio of the carbonaceous binder to the micro- and nano-level $SiO_x$ particles is 5:95-30:70;

(4) under a non-oxidizing atmosphere with a gas flow rate of 10~100.0 L/min, raising the temperature to 200~900° C. at a heating rate of 0.5~10° C./min and granulating the precursor I described in step (3) to obtain a Precursor II;

(5) under a non-oxidizing atmosphere with a gas flow rate of 10~100.0 L/min, raising the temperature to 700~1500° C. at a heating rate of 1.0~15° C./min, and modifying and carbonizing the precursor II in step (4), wherein the duration for the modifying and carbonizing is 2~6 h, to obtain a precursor III; and (6) screening, demagnetizing and drying the precursor III in step (5) to obtain the silicon oxide/carbon composite negative electrode material.

In a third aspect, the present disclosure provides a lithium-ion battery which comprises the silicon oxide/carbon composite negative electrode material as described in the first aspect.

The pole piece of the negative electrode of the lithium-ion battery is prepared by mixing the silicon oxide/carbon composite negative electrode material of the first aspect, a conductive agent and a binder in a solvent in a mass ratio of 92:4:4, and coating the mixture on a copper foil current collector and then drying the same under a vacuum atmosphere.

Optionally, the positive electrode active material used in the pole piece of the positive electrode of the lithium-ion battery is any one of or the combination of at least two of a ternary material, a lithium-rich material, lithium cobaltate, lithium nickelate, spinel lithium manganate, layered lithium manganate or lithium iron phosphate.

Optionally, the conductive agent is graphite powder and/or a nano conductive liquid.

Optionally, the nano conductive liquid is composed of 0.5-20 wt % of a nano-carbon material and a dispersion solvent.

Optionally, the nano-carbon material is any one of or the combination of at least two of graphene, carbon nanotube, nano-carbon fiber, fullerene, carbon black, and acetylene black.

Optionally, the number of graphite layers of the graphene is within 1-100.

Optionally, the diameters of the carbon nanotube and nano-carbon fiber are 0.2~500 nm.

Optionally, the particle sizes of the fullerene, carbon black and acetylene black are 1-200 nm.

Optionally, the binder is any one of or the combination of at least two of polyimide resin, acrylic resin, polyvinylidene fluoride, polyvinyl alcohol, sodium carboxymethyl cellulose or styrene butadiene rubber.

Optionally, the type of the lithium-ion battery is of a conventional button type, aluminum shell, steel shell, or soft-packing lithium-ion battery, and the conventional button type lithium-ion battery can be selected.

Compared with the prior art, the present disclosure has the following advantageous effects:

(1) the silicon oxide/carbon composite negative electrode material provided by the present disclosure is in a reasonable structure, the distribution of the particle size of the $SiO_x$ particles is suitable, the capacity and the first coulomb efficiency are good, and the rate performance and cycle stability are excellent, wherein the capacity can be more than 1529 mAh/g, the first coulomb efficiency can be more than 75.1%, the battery rate performance of 1 C/2 C can reach 94.0%, and the 50-cycle capacity retention rate can reach 93.8%.

(2) the preparation method provided in the present disclosure focuses on controlling the particle size distribution of $SiO_x$ raw materials, and the micro- and nano-level $SiO_x$ powder with a specific particle size distribution and the carbonaceous binder are mixed and coated, so that the carbon material is filled evenly and tightly among the micro- and nano-level $SiO_x$ particles, and granulation is conducted while the $SiO_x$ is coated with carbon, to obtain a silicon oxide/carbon composite negative electrode material with high first efficiency of capacity, excellent rate performance and cycle stability; and the preparation method has short process flow, simple operation, and is easy for industrialization and large-scale production.

After reading and understanding the detailed description and the accompanying drawings, other aspects of the present disclosure can be understood.

DETAILED DESCRIPTION OF EMBODIMENTS

Figure 1:
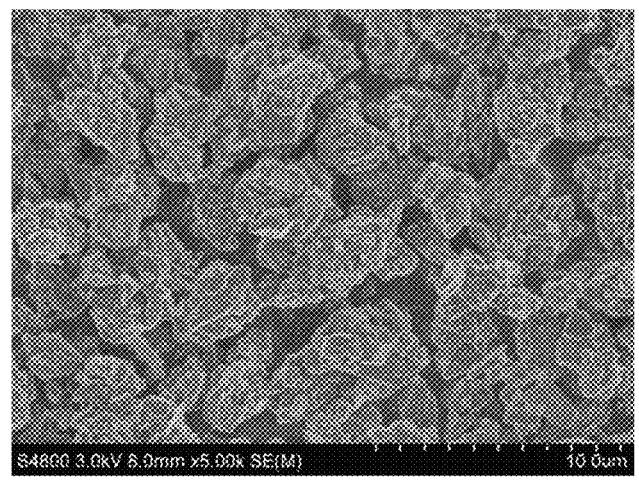
FIG. 1 is a scanning electron microscope image of the silicon oxide/carbon composite negative electrode material prepared according to embodiment 1 of the present disclosure.

In order to more clearly describe the present disclosure for the convenience of understanding the technical solution of the present disclosure, the following text is a further detailed description of the present disclosure. However, the following embodiments are only simple examples of the present disclosure, and are not intended to represent or limit the scope of protection of the claims, and the scope of protection of the present disclosure shall be based on the claims.

The following are typical but not restrictive embodiments of the present disclosure.

Embodiment 1

In this embodiment, the silicon oxide/carbon composite negative electrode material is prepared according to the following method:
1) mixing metal silicon and silicon dioxide in a molar ratio of 1.5:1, and under the protection of argon, reacting at a pressure below 20 Pa and a temperature of 1380° C. to produce a silicon oxide gas, and collecting the gas at a pressure below 30 Pa at a low temperature zone collector and then precipitating to obtain the product, i.e., $SiO_y$ blocks, y=0.98;
2) pulverizing the $SiO_y$ blocks obtained in step 1) into powder of about 1 mm by a universal pulverizer, and then pulverizing the product using a planetary ball mill to obtain silicon oxide particles with a median particle size of 6 μm; repeatedly grading (classifying) the obtained silicon oxide particles by a multi-stage air classifier to obtain silicon oxide particles with a specific particle size range, which specifications are as follows: $SiO_x$ particles, wherein x is 1.05, and the D50 of the $SiO_x$ particle is 1.1 μm, the volume of particles with a particle size below 1.0 μm accounts for 55% of all $SiO_x$ particles, and D90=3.9 μm;
3) placing the asphalt powder, polyacrylonitrile, the $SiO_x$ particles obtained by grading in step 2) and solvent glycol in a mass ratio of 2.5:2.5:20:75 in a high-speed dispersion reactor, adjusting the rotating speed to 1000 rpm, and ball milling and dispersing for 10 h to obtain a precursor I;
4) raising the temperature of the air inlet of a closed spray drying equipment to 230° C. at a rate of 10° C./min, and introducing high-purity argon, then pumping the precursor I through a peristaltic pump, and the air outlet temperature being 150° C., and obtaining a precursor II by collecting materials;
5) placing the precursor II in a roller kiln, and introducing a nitrogen protective gas, increasing the temperature to 930.0° C. at 10.0° C./min, keeping the temperature for 5.0 h, and cooling to room temperature naturally to obtain precursor III; and
6) screening and demagnetizing to obtain the silicon oxide/carbon composite negative electrode material.

The silicon oxide/carbon composite negative electrode material prepared in the present embodiment is a secondary particle composed of a $SiO_x/C$ material. The $SiO_x/C$ material comprises $SiO_x$ particles and a carbon layer coated on the surface of the $SiO_x$ particles. The $SiO_x$ particles comprise Si microcrystals, the Si microcrystals are uniformly dispersed in $SiO_x$ particles and $SiO_x$ particles are oriented randomly to each other.

In this embodiment, the following method is used to characterize the structure of the product. A Malvern particle size analyzer (model: MASTERSIZER 2000) is used to test the particle size of the $SiO_x$ particles, the $SiO_x/C$ material, and the silicon oxide/carbon composite negative electrode material; a Micromeritics specific surface area tester (Model: ST-08) is used to test the specific surface area and total pore volume, the Beishide compacted density tester (Model: 3H-2000TD) is used to test the true density, and the porosity is calculated according to the results; the Micron (CARVER 4350.22) is used to measure the compacted density, and the X'Pert PRO X-ray diffractometer (XRD) is used to test the half-peak width of Si and calculate the grain size of the Si microcrystals in combination with the Scherrer formula:

$$Si-\text{size} = \frac{0.89 \times 0.15406}{FWHM \times 0.97}.$$

The value of x, D50, and D90 of $SiO_x$ particles in the silicon oxide/carbon composite negative electrode material product, and the ratio of the volume of particles with a particle size below 1.0 μm to the total volume of $SiO_x$ particles are the same as the characteristic structure of $SiO_x$ particles in step (2).

The grain size of the Si microcrystal is 3.9 nm, in the silicon oxide/carbon composite negative electrode material, the mass fraction of carbon is 10 wt %, the D50 of the silicon oxide/carbon composite negative electrode material is 4.3 μm, and the compacted density is 1.12 g/cm³, the porosity is 2%, and the specific surface area is 4.13 m²/g. The D50 of $SiO_x/C$ material is 3.9 times of that of the $SiO_x$.

The test results of the electrochemical performance of the silicon oxide/carbon composite negative electrode material prepared in this embodiment are shown in Table 1.

FIG. 1 is a scanning electron microscope image of the silicon oxide/carbon composite negative electrode material prepared in this embodiment; and from the figure, it can be seen that the particles of the silicon oxide/carbon composite negative electrode material prepared in this embodiment are relatively dense.

Figure 2:
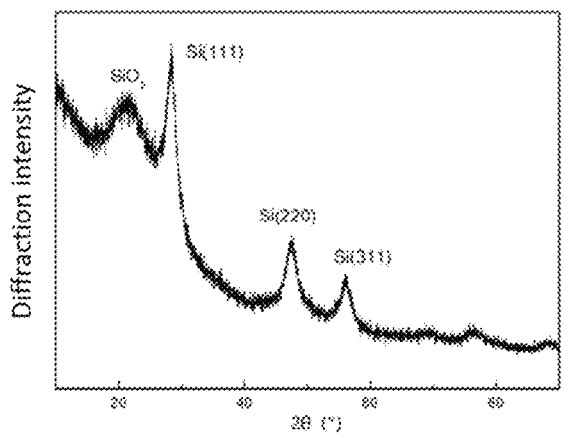
FIG. 2 is an XRD graph of the silicon oxide/carbon composite negative electrode material prepared according to embodiment 1 of the present disclosure.

FIG. 2 is an XRD graph of the silicon oxide/carbon composite negative electrode material prepared according to the embodiment 1 of the present disclosure; and from the figure, it can be seen that the silicon oxide/carbon composite negative electrode material prepared in this embodiment has diffraction peaks of silicon dioxide and silicon.

Figure 3:
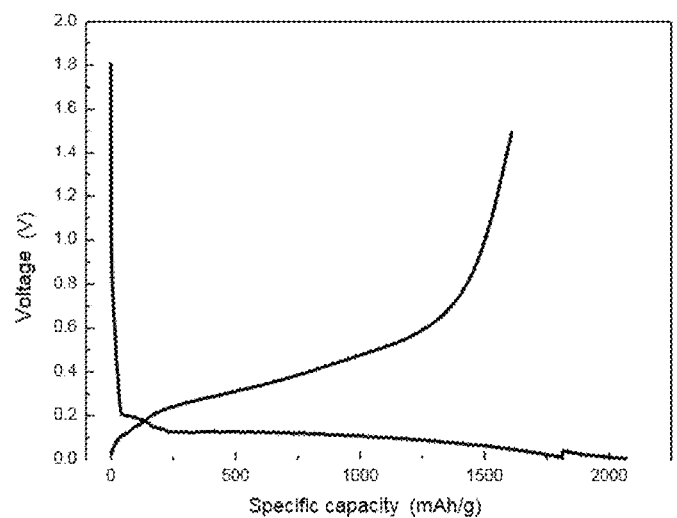
FIG. 3 is a first charging and discharging curve of the silicon oxide/carbon composite negative electrode material prepared according to embodiment 1 of the present disclosure.

FIG. 3 is a first charging and discharging curve of the silicon oxide/carbon composite negative electrode material prepared according to embodiment 1 of the present disclosure; and from the figure, it can be seen that the silicon oxide/carbon composite negative electrode material prepared in this embodiment has higher capacity and first charge and discharge efficiency.

Figure 4:
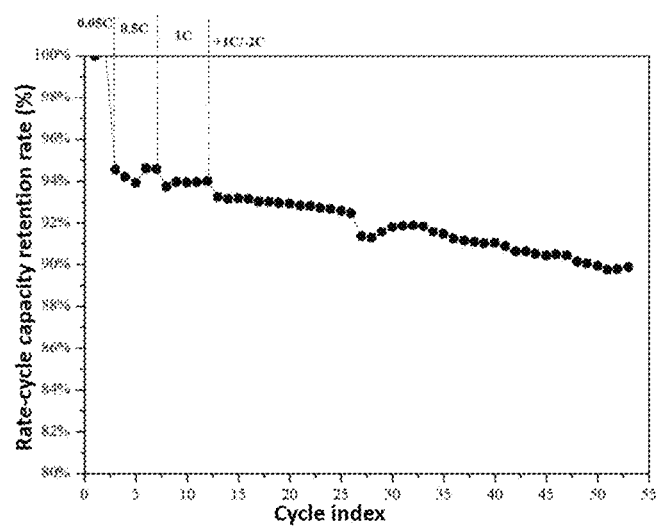
FIG. 4 is a rate-cycle performance curve of the silicon oxide/carbon composite negative electrode material prepared according to embodiment 1 of the present disclosure.

FIG. 4 is a rate-cycle performance curve of the silicon oxide/carbon composite negative electrode material prepared according to embodiment 1 of the present disclosure; and from the figure, it can be seen that the silicon oxide/carbon composite negative electrode material prepared in this embodiment has excellent rate performance.

Figure 5:
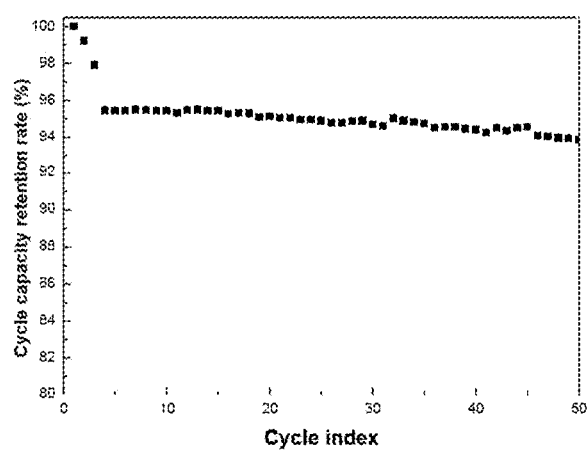
FIG. 5 is a cycle performance curve of the silicon oxide/carbon composite negative electrode material prepared according to embodiment 1 of the present disclosure.
Figure 6:
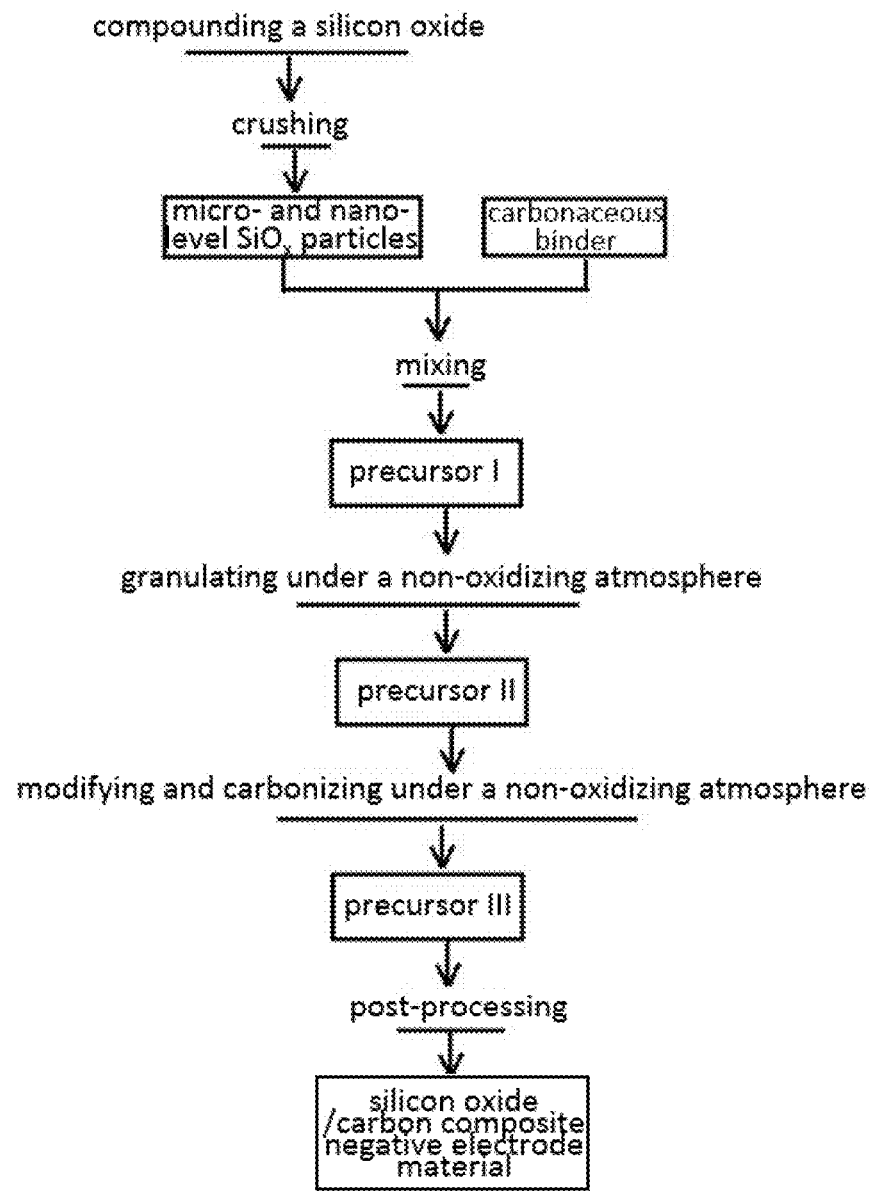
FIG. 6 is a schematic view of the flow of the preparation method for the silicon oxide/carbon composite negative electrode material provided by the present disclosure.

FIG. 5 is a cycle performance curve of the silicon oxide/carbon composite negative electrode material prepared according to embodiment 1 of the present disclosure; and from the figure, it can be seen that the silicon oxide/carbon composite negative electrode material prepared in this embodiment has excellent cycle performance.

Embodiment 2

In this embodiment, the silicon oxide/carbon composite negative electrode material is prepared according to the following method:
1) mixing metal silicon and silicon dioxide in a molar ratio of 1:1, and under the protection of argon, reacting at a pressure below 50 Pa and a temperature of 1380° C. to produce a silicon oxide gas, collecting the gas at a pressure below 30 Pa at a low temperature zone collector and precipitating to obtain a product, i.e., the $SiO_y$ blocks, y=1.02;

2) pulverizing the silicon oxide blocks obtained in step 1) into powder of about 1 mm by a mechanical pulverizer, and then pulverizing the product using a horizontal ball mill to obtain silicon oxide particles with a median particle size of 7 μm; grading the obtained particles by a multi-stage air classifier to obtain silicon oxide particles with a specific particle size range, which specifications are as follows: $SiO_x$ particles, wherein x is 0.98, and the median D50 of the $SiO_x$ particle is 2.8 μm, the volume of particles with a particle size below 1.0 μm accounts for 38% of all $SiO_x$ particles, and D90=6.7 μm;

3) placing polyacrylonitrile, phenolic resin powder and the particles obtained by grading in step 2) in a mass ratio of 10:10:80 in a V-shaped mixer, adjusting the rotating speed to 1000 rpm, and mixing for 1 h to obtain a precursor I;

4) placing the precursor I in a horizontal mixing and heating equipment, and introducing high-purity nitrogen at a flow rate of 60 L/min, heating the material by circulating a heat transfer oil and raising the temperature to 650° C. at a heating rate of 8° C./min, and mixing and coating for 120 min to obtain a precursor II;

5) placing the precursor II to a box furnace, and introducing a nitrogen protection gas at a flow rate of 60 L/min and raising the temperature to 900.0° C. at 10.0° C./min, keeping the temperature for 4.0 h, and cooling to room temperature naturally and then obtaining a precursor III; and 6) screening and demagnetizing to obtain the silicon oxide composite negative electrode material of the lithium-ion battery.

The silicon oxide/carbon composite negative electrode material prepared in the present embodiment is a secondary particle composed of a $SiO_x/C$ material. The $SiO_x/C$ material comprises $SiO_x$ particles and a carbon layer coated on the surface of the $SiO_x$ particles. The $SiO_x$ particles comprise Si microcrystals, the Si microcrystals are uniformly dispersed in $SiO_x$ particles and $SiO_x$ particles are oriented randomly to each other.

In this embodiment, the method according to embodiment 1 is used to characterize the structure of the product.

The value of x, D50, and D90 of $SiO_x$ particles in the silicon oxide/carbon composite negative electrode material product, and the ratio of the volume of particles with a particle size below 1.0 μm to the total volume of $SiO_x$ particles are the same as the characteristic structure of $SiO_x$ particles in step (2).

The grain size of the Si microcrystal is 3.5 nm, in the silicon oxide/carbon composite negative electrode material, the mass fraction of carbon is 13 wt %, the D50 of the silicon oxide/carbon composite negative electrode material is 6.3 μm, and the compacted density is 1.28 g/cm³, the porosity is 2.1%, and the specific surface area is 3.9 m²/g. The D50 of $SiO_x/C$ material is 2.3 times of that of the $SiO_x$.

The test results of the electrochemical performance of the silicon oxide/carbon composite negative electrode material prepared in this embodiment are shown in Table 1.

Embodiment 3

In this embodiment, the silicon oxide/carbon composite negative electrode material is prepared according to the following method:

1) mixing metal silicon and silicon dioxide in a molar ratio of 1:3, and under the protection of neon, reacting at a pressure below 100 Pa and a temperature of 1500° C. to produce a silicon oxide gas, collecting the gas at a pressure below 50 Pa on a low temperature zone collector and precipitating to obtain a product, i.e., the $SiO_y$ blocks, y=0.91;

2) pulverizing the silicon oxide blocks obtained in step 1) into powder of about 1 mm by a mechanical pulverizer, and then pulverizing the product using a horizontal ball mill to obtain silicon oxide particles with a median particle size of 4.3 μm; grading the obtained particles by a multi-stage air classifier to obtain silicon oxide particles with a specific particle size range, which specifications are as follows: $SiO_x$ particles, wherein x is 1.13, and the median D50 of the $SiO_x$ particle is 0.6 μm, the volume of particles with a particle size below 1.0 μm accounts for 60% of all $SiO_x$ particles, and D90=1.6 μm;

3) placing polyacrylonitrile, phenolic resin powder and the particles obtained by grading in step 2) in a mass ratio of 20:10:70 in a V-shaped mixer, adjusting the rotating speed to 1000 rpm, and mixing for 1 h to obtain a precursor I;

4) placing the precursor I in a horizontal mixing and heating equipment, and introducing high-purity nitrogen at a flow rate of 30 L/min, heating the material by circulating a heat transfer oil and raising the temperature to 900° C. at a heating rate of 10° C./min, and mixing and coating for 100 min to obtain a precursor II;

5) placing the precursor II to a box furnace, and introducing a nitrogen protection gas at a flow rate of 30 L/min and raising the temperature to 1100° C. at 15° C./min, keeping the temperature for 2.0 h, and cooling to room temperature naturally and then obtaining a precursor III; and 6) screening and demagnetizing to obtain the silicon oxide composite negative electrode material of the lithium-ion battery.

The silicon oxide/carbon composite negative electrode material prepared in the present embodiment is a secondary particle composed of a $SiO_x/C$ material. The $SiO_x/C$ material comprises $SiO_x$ particles and a carbon layer coated on the surface of the $SiO_x$ particles. The $SiO_x$ particles comprise Si microcrystals, the Si microcrystals are uniformly dispersed in $SiO_x$ particles and $SiO_x$ particles are oriented randomly to each other.

In this embodiment, the method according to embodiment 1 is used to characterize the structure of the product.

The value of x, D50, and D90 of $SiO_x$ particles in the silicon oxide/carbon composite negative electrode material product, and the ratio of the volume of particles with a particle size below 1.0 μm to the total volume of $SiO_x$ particles are the same as the characteristic structure of $SiO_x$ particles in step (2).

The grain size of the Si microcrystal is 9 nm, in the silicon oxide/carbon composite negative electrode material, the mass fraction of carbon is about 15 wt %, the D50 of the silicon oxide/carbon composite negative electrode material is 2.9 μm, and the compacted density is 1.3 g/cm³, the porosity is 9%, and the specific surface area is 8.3 m²/g. The D50 of $SiO_x/C$ material is 4.8 times of that of the $SiO_x$.

The test results of the electrochemical performance of the silicon oxide/carbon composite negative electrode material prepared in this embodiment are shown in Table 1.

Embodiment 4

In this embodiment, the silicon oxide/carbon composite negative electrode material is prepared according to the following method:
1) mixing metal silicon and silicon dioxide in a molar ratio of 5:1, and under the protection of helium, reacting at a pressure at 0.1 Pa and a temperature of 1000° C. to produce a silicon oxide gas, collecting the gas at a pressure of 0.1 Pa at a low temperature zone collector and precipitating to obtain a product, i.e., the $SiO_y$ blocks, y=1.09;
2) pulverizing the silicon oxide blocks obtained in step 1) into powder of about 1 mm by a mechanical pulverizer, and then pulverizing the product using a horizontal ball mill to obtain silicon oxide particles with a median particle size of 8 μm; grading the obtained particles by a multi-stage air classifier to obtain silicon oxide particles with a specific particle size range, which specifications are as follows: $SiO_x$ particles, wherein x is 1.0, and the median D50 of the $SiO_x$ particle is 2.9 μm, the volume of particles with a particle size below 1.0 μm accounts for 25% of all $SiO_x$ particles, and D90=9.5 μm;
3) placing polyacrylonitrile, phenolic resin powder and the particles obtained by grading in step 2) in a mass ratio of 2.5:2.5:95 in a V-shaped mixer, adjusting the rotating speed to 1000 rpm, and mixing for 1 h to obtain a precursor I;
4) placing the precursor I in a horizontal mixing and heating equipment, and introducing high-purity nitrogen at a flow rate of 100 L/min, heating the material by circulating a heat transfer oil and raising the temperature to 200° C. at a heating rate of 0.5° C./min, and mixing and coating for 100 min to obtain a precursor II;
5) placing the precursor II to a box furnace, and introducing a nitrogen protection gas at a flow rate of 100 L/min and raising the temperature to 830° C. at 1° C./min, keeping the temperature for 6.0 h, and cooling to room temperature naturally and then obtaining a precursor III; and
6) screening and demagnetizing to obtain the silicon oxide composite negative electrode material of the lithium-ion battery.

The silicon oxide/carbon composite negative electrode material prepared in the present embodiment is a secondary particle composed of a $SiO_x/C$ material. The $SiO_x/C$ material comprises $SiO_x$ particles and a carbon layer coated on the surface of the $SiO_x$ particles. The $SiO_x$ particles comprise Si microcrystals, the Si microcrystals are uniformly dispersed in $SiO_x$ particles and $SiO_x$ particles are oriented randomly to each other.

In this embodiment, the method according to embodiment 1 is used to characterize the structure of the product.

The value of x, D50, and D90 of $SiO_x$ particles in the silicon oxide/carbon composite negative electrode material product, and the ratio of the volume of particles with a particle size below 1.0 μm to the total volume of $SiO_x$ particles are the same as the characteristic structure of $SiO_x$ particles in step (2).

The grain size of the Si microcrystal is 3 nm; in the silicon oxide/carbon composite negative electrode material, the mass fraction of carbon is 3 wt %, the D50 of the silicon oxide/carbon composite negative electrode material is 5.8 μm, and the compacted density is 1.5 g/cm³, the porosity is 2.3%, and the specific surface area is 1.3 m²/g. The D50 of $SiO_x/C$ material is 2.0 times of that of the $SiO_x$.

The test results of the electrochemical performance of the silicon oxide/carbon composite negative electrode material prepared in this embodiment are shown in Table 1.

Embodiment 5

In this embodiment, the silicon oxide/carbon composite negative electrode material is prepared by referring to the embodiment 2, while the difference lies in: in step 4), introducing high-purity nitrogen at a flow rate of 10 L/min, and raising the temperature to 1000° C.; and in step 5), introducing a nitrogen protection gas at a flow rate of 10 L/min.

The silicon oxide/carbon composite negative electrode material prepared in the present embodiment is a secondary particle composed of a $SiO_x/C$ material. The $SiO_x/C$ material comprises $SiO_x$ particles and a carbon layer coated on the surface of the $SiO_x$ particles. The $SiO_x$ particles comprise Si microcrystals, the Si microcrystals are uniformly dispersed in $SiO_x$ particles and $SiO_x$ particles are oriented randomly to each other.

In this embodiment, the method according to embodiment 1 is used to characterize the structure of the product.

Regarding the $SiO_x$ particles in the silicon oxide/carbon composite negative electrode material product, the value of x is 0.98, and the D50 of the $SiO_x$ particle is 2.8 μm, the volume of particles with a particle size below 1.0 μm accounts for 38% of all $SiO_x$ particles, and D90=6.7 μm.

The grain size of the Si microcrystal is 7 nm, in the silicon oxide/carbon composite negative electrode material, the mass fraction of carbon is 13 wt %, the D50 of the silicon oxide/carbon composite negative electrode material is 6.1 μm, and the compacted density is 1.32 g/cm³, the porosity is 2.5%, and the specific surface area is 4.1 m²/g. The D50 of $SiO_x/C$ material is 2.2 times of that of the $SiO_x$.

The test results of the electrochemical performance of the silicon oxide/carbon composite negative electrode material prepared in this embodiment are shown in Table 1.

Embodiment 6

In this embodiment, the silicon oxide/carbon composite negative electrode material is prepared by referring to the embodiment 2, while the difference lies in: in step 4), raising the temperature to 950° C.

The silicon oxide/carbon composite negative electrode material prepared in the present embodiment is a secondary particle composed of a $SiO_x/C$ material. The $SiO_x/C$ material comprises $SiO_x$ particles and a carbon layer coated on the surface of the $SiO_x$ particles. The $SiO_x$ particles comprise Si microcrystals, the Si microcrystals are uniformly dispersed in $SiO_x$ particles and $SiO_x$ particles are oriented randomly to each other.

In this embodiment, the method according to embodiment 1 is used to characterize the structure of the product.

Regarding the $SiO_x$ particles in the silicon oxide/carbon composite negative electrode material product, the value of x is 0.98, and the D50 of the $SiO_x$ particle is 2.8 μm, the volume of particles with a particle size below 1.0 μm accounts for 38% of all $SiO_x$ particles, and D90=6.7 μm.

The grain size of the Si microcrystal is 4 nm, in the silicon oxide/carbon composite negative electrode material, the mass fraction of carbon is 13.2 wt %, the D50 of the silicon oxide/carbon composite negative electrode material is 7.0 µm, and the compacted density is 1.3 g/cm³, the porosity is 2.1%, and the specific surface area is 3.5 m²/g. The D50 of $SiO_x$/C material is 2.5 times of that of the $SiO_x$.

The test results of the electrochemical performance of the silicon oxide/carbon composite negative electrode material prepared in this embodiment are shown in Table 1.

Embodiment 7

In this embodiment, the silicon oxide/carbon composite negative electrode material is prepared by referring to the embodiment 2, while the difference lies in: in step (2), $SiO_x$ particles, wherein x is 0.98, and the D50 of the $SiO_x$ particle is 4.5 µm, the volume of particles with a particle size below 1.0 µm accounts for 29% of all $SiO_x$ particles, and D90=9.8 µm.

The silicon oxide/carbon composite negative electrode material prepared in the present embodiment is a secondary particle composed of a $SiO_x$/C material. The $SiO_x$/C material comprises $SiO_x$ particles and a carbon layer coated on the surface of the $SiO_x$ particles. The $SiO_x$ particles comprise Si microcrystals, the Si microcrystals are uniformly dispersed in $SiO_x$ particles and $SiO_x$ particles are oriented randomly to each other.

In this embodiment, the method according to embodiment 1 is used to characterize the structure of the product.

The value of x, D50, and D90 of $SiO_x$ particles in the silicon oxide/carbon composite negative electrode material product, and the ratio of the volume of particles with a particle size below 1.0 µm to the total volume of $SiO_x$ particles are the same as the characteristic structure of $SiO_x$ particles in step (2).

The grain size of the Si microcrystal is 3.6 nm, in the silicon oxide/carbon composite negative electrode material, the mass fraction of carbon is 13 wt %, the D50 of the silicon oxide/carbon composite negative electrode material is 8.3 µm, and the compacted density is 1.18 g/cm³, the porosity is 2.0%, and the specific surface area is 1.1 m²/g. The D50 of $SiO_x$/C material is 1.8 times of that of the $SiO_x$.

The test results of the electrochemical performance of the silicon oxide/carbon composite negative electrode material prepared in this embodiment are shown in Table 1.

Embodiment 8

In this embodiment, the silicon oxide/carbon composite negative electrode material is prepared by referring to the embodiment 2, while the difference lies in: in step (2), $SiO_x$ particles, wherein x is 0.98, and the D50 of the $SiO_x$ particle is 0.2 µm, the volume of particles with a particle size below 1.0 µm accounts for 58% of all $SiO_x$ particles, and D90=1.7 µm.

The silicon oxide/carbon composite negative electrode material prepared in the present embodiment is a secondary particle composed of a $SiO_x$/C material. The $SiO_x$/C material comprises $SiO_x$ particles and a carbon layer coated on the surface of the $SiO_x$ particles. The $SiO_x$ particles comprise Si microcrystals, the Si microcrystals are uniformly dispersed in $SiO_x$ particles and $SiO_x$ particles are oriented randomly to each other.

In this embodiment, the method according to embodiment 1 is used to characterize the structure of the product.

The value of x, D50, and D90 of $SiO_x$ particles in the silicon oxide/carbon composite negative electrode material product, and the ratio of the volume of particles with a particle size below 1.0 µm to the total volume of $SiO_x$ particles are the same as the characteristic structure of $SiO_x$ particles in step (2).

The grain size of the Si microcrystal is 3.7 nm, in the silicon oxide/carbon composite negative electrode material, the mass fraction of carbon is 13 wt %, the D50 of the silicon oxide/carbon composite negative electrode material is 2.4 µm, and the compacted density is 1.1 g/cm³, the porosity is 5.3%, and the specific surface area is 9.8 m²/g. The D50 of $SiO_x$/C material is 12 times of that of the $SiO_x$.

The test results of the electrochemical performance of the silicon oxide/carbon composite negative electrode material prepared in this embodiment are shown in Table 1.

Embodiment 9

In this embodiment, the silicon oxide/carbon composite negative electrode material is prepared according to the following method:
1) mixing metal silicon and silicon dioxide in a molar ratio of 1.8:1, and under the protection of argon, reacting at a pressure below 50 Pa and a temperature of 1380° C. to produce a silicon oxide gas, collecting the gas at a pressure below 30 Pa at a low temperature zone collector and precipitating to obtain a product, i.e., the $SiO_y$ blocks, y=1.1, placing the $SiO_y$ blocks to a box furnace, and introducing a nitrogen protection gas and raising the temperature to 950.0° C. at 8.0° C./min, keeping the temperature for 4 h, and then taking the same out;
2) pulverizing the $SiO_y$ blocks obtained in step 1) into powder of about 1.5 mm by a jet crusher, and then pulverizing the product using a planetary ball mill to obtain silicon oxide particles with a D50 of 8 µm; repeatedly grading the obtained particles by a multi-stage air classifier to obtain silicon oxide particles with a specific particle size range, which specifications are as follows: $SiO_x$ particles, wherein the value of x is 0.95, and the D50 of the $SiO_x$ particle is 4.3 µm, the volume of particles with a particle size below 1.0 µm accounts for 13% of all $SiO_x$ particles, and D90=9 µm;
3) placing asphalt powder, pplypyrrole and the particles obtained by grading in step 2) in a mass ratio of 15:10:75 in a high-speed fusion machine, adjusting the rotating speed to 1000 rpm, and mixing for 1 h to obtain a precursor I;
4) placing the precursor I in an NH-type vacuum kneading equipment, and introducing high-purity nitrogen, raising the temperature to 700° C. at a heating rate of 3° C./min, and continuously stirring, mixing and coating for 180 min to obtain a precursor II;
5) placing the precursor II to a roller kiln, and introducing a nitrogen protection gas and raising the temperature to 900.0° C. at 10.0° C./min, keeping the temperature for 4.0 h, and cooling to room temperature naturally and then obtaining a precursor III; and
6) screening and demagnetizing to obtain the silicon oxide composite negative electrode material of the lithium-ion battery.

The silicon oxide/carbon composite negative electrode material prepared in the present embodiment is a secondary particle composed of a $SiO_x$/C material. The $SiO_x$/C material comprises $SiO_x$ particles and a carbon layer coated on the surface of the $SiO_x$ particles. The $SiO_x$ particles comprise Si microcrystals, the Si microcrystals are uniformly dispersed in $SiO_x$ particles and $SiO_x$ particles are oriented randomly to each other.

In this embodiment, the method according to embodiment 1 is used to characterize the structure of the product.

The value of x, D50, and D90 of $SiO_x$ particles in the silicon oxide/carbon composite negative electrode material product, and the ratio of the volume of particles with a particle size below 1.0 μm to the total volume of $SiO_x$ particles are the same as the characteristic structure of $SiO_x$ particles in step (2).

The grain size of the Si microcrystal is 3.6 nm, in the silicon oxide/carbon composite negative electrode material, the mass fraction of carbon is 14 wt %, the D50 of the silicon oxide/carbon composite negative electrode material is 7.9 μm, and the compacted density is 1.2 g/cm$^3$, the porosity is 2.0%, and the specific surface area is 1.5 m$^2$/g. The D50 of $SiO_x$/C material is 1.8 times of that of the $SiO_x$.

The test results of the electrochemical performance of the silicon oxide/carbon composite negative electrode material prepared in this embodiment are shown in Table 1.

Embodiment 10

In this embodiment, the silicon oxide/carbon composite negative electrode material is prepared according to the following method:
1) mixing metal silicon and silicon dioxide in a molar ratio of 2:1, and under the protection of argon, reacting at a pressure below 20 Pa and a temperature of 1380° C. to produce a silicon oxide gas, collecting the gas at a pressure below 30 Pa at a low temperature zone collector and precipitating to obtain a product, i.e., the $SiO_y$ blocks, y=1.05;
2) pulverizing the silicon oxide blocks obtained in step 1) into powder of about 1 mm by a ultra-low temperature crusher, and then pulverizing the product using a planetary ball mill to obtain silicon oxide particles with a D50 of 1.5 μm; repeatedly grading the obtained particles by a multi-stage air classifier to obtain silicon oxide particles with a specific particle size range, which specifications are as follows: $SiO_x$ particles, wherein x is 1.15, and the D50 of the $SiO_x$ particle is 0.4 μm, the volume of particles with a particle size below 1.0 μm accounts for 67% of all $SiO_x$ particles, and D90=1.9 μm;
3) placing asphalt powder and the particles obtained by grading in step 2) in a mass ratio of 10:90 in a high-energy ball mill, adjusting the rotating speed to 1000 rpm, and mixing for 5 h to obtain a precursor I;
4) placing the precursor I to a pusher kiln, and introducing a nitrogen protection gas and raising the temperature to 980.0° C. at 10.0° C./min, keeping the temperature for 5.0 h, and cooling to room temperature naturally and then obtaining a precursor II; and
5) screening and demagnetizing to obtain the silicon oxide composite negative electrode material of the lithium-ion battery.

The silicon oxide/carbon composite negative electrode material prepared in the present embodiment is a secondary particle composed of a $SiO_x$/C material. The $SiO_x$/C material comprises $SiO_x$ particles and a carbon layer coated on the surface of the $SiO_x$ particles. The $SiO_x$ particles comprise Si microcrystals, the Si microcrystals are uniformly dispersed in $SiO_x$ particles and $SiO_x$ particles are oriented randomly to each other.

In this embodiment, the method according to embodiment 1 is used to characterize the structure of the product.

The value of x, D50, and D90 of $SiO_x$ particles in the silicon oxide/carbon composite negative electrode material product, and the ratio of the volume of particles with a particle size below 1.0 μm to the total volume of $SiO_x$ particles are the same as the characteristic structure of $SiO_x$ particles in step (2).

The grain size of the Si microcrystal is 4.5 nm, in the silicon oxide/carbon composite negative electrode material, the mass fraction of carbon is 7 wt %, the D50 of the silicon oxide/carbon composite negative electrode material is 1.7 μm, and the compacted density is 1.08 g/cm$^3$, the porosity is 8.3%, and the specific surface area is 9.4 m$^2$/g. The D50 of $SiO_x$/C material is 4.3 times of that of the $SiO_x$.

The test results of the electrochemical performance of the silicon oxide/carbon composite negative electrode material prepared in this embodiment are shown in Table 1.

Comparative Embodiment 1

For the specific preparation method of the present comparative embodiment, reference is made to embodiment 2, and the difference lies in that in steps (1) and (2), the silicon oxide is directly used as the raw material for ball milling and grading; and the silicon oxide/carbon composite negative electrode material prepared according to the present comparative embodiment is a secondary particle composed of a $SiO_x$/C material, the $SiO_x$/C material comprises $SiO_x$ particles and a carbon layer coated on the surface of the $SiO_x$ particles, but the $SiO_x$ particles do not comprise Si microcrystals.

The test results of the electrochemical performance of the silicon oxide/carbon composite negative electrode material prepared in this comparative embodiment are shown in Table 1.

Electrochemical Performance Testing Method:

taking the material prepared in each embodiment and the comparative embodiment as the negative electrode material, mixing it with the binder (CMC+SBR) and the conductive agent in a mass ratio of 92:4:4, adding an appropriate amount of water as a dispersant to prepare a slurry, and coating the slurry on a copper foil, and performing vacuum drying and rolling to prepare a negative electrode sheet; adopting metal lithium sheet as the positive electrode, and using an electrolyte mixed with $LiPF_6$ three-component mixed solvent of 1 mol/L according to EC:DMC:EMC=1:1:1 (v/v), and using polypropylene microporous membrane as the separator, assembling a CR2025 type button battery in the MB200B type glovebox of M. Braun Inertgas-Systeme GmbH of Germany filled with argon.

Test of first efficiency of capacity: the charge-discharge test of the button battery is performed on the LAND battery test system of Wuhan Jinnuo Electronics Co., Ltd., and under a normal temperature condition, charging and discharging are conducted at a constant current of 0.1 C, and the charge-discharge voltage is limited to 0.005~1.5V.

Rate performance test: the charge-discharge test of the button battery is performed on the LAND battery test system of Wuhan Jinnuo Electronics Co., Ltd., under a normal temperature condition, discharging is conducted at a constant current of 1 C, charging is conducted at a constant current of 2 C, and the charge-discharge voltage is limited to 0.005~1.5V.

Cycle performance test: the charge-discharge test of the button battery is performed on the LAND battery test system of Wuhan Jinnuo Electronics Co., Ltd., and under a normal temperature condition, charging and discharging are conducted at a constant current of 0.1 C, and the charge-discharge voltage is limited to 0.005~1.5V.

The test results of the electrochemical performance are shown in the following table.

TABLE 1

|  | First reversible capacity mAh/g | First charge-discharge efficiency % | 1 C/2 C Rate performance % | 50-cycle capacity retention rate % |
| --- | --- | --- | --- | --- |
| Embodiment 1 | 1600.1 | 76.7 | 94.0 | 93.8 |
| Embodiment 2 | 1610 | 77.1 | 92.3 | 92.6 |
| Embodiment 3 | 1529 | 75.1 | 91.8 | 93.2 |
| Embodiment 4 | 1591.2 | 76.3 | 93.6 | 92.1 |
| Embodiment 5 | 1605.2 | 77.0 | 92.0 | 92.5 |
| Embodiment 6 | 1603.1 | 76.8 | 92.2 | 92.3 |
| Embodiment 7 | 1618.6 | 77.8 | 90.6 | 88.4 |
| Embodiment 8 | 1519.3 | 73.1 | 84.5 | 89.8 |
| Embodiment 9 | 1625.9 | 77.5 | 90.5 | 87.9 |
| Embodiment 10 | 1517.8 | 72.4 | 84.0 | 89.5 |
| Comparative Embodiment 1 | 1434 | 60.8 | 54.3 | 65.2 |

Based on the above embodiments and comparative embodiment, it can be seen that the silicon oxide/carbon composite negative electrode material provided in each of embodiments 1~6 of the present disclosure is in a reasonable structure, and its internal porous structure can absorb a part of the volume expansion to synergistically improve the cycle performance of the material; in addition, the carbon filled among the $SiO_x$ particles can provide good electrical contact among the particles, reduces direct contact between the electrolyte and active substances and thus avoids the cycle degradation caused by loss of electrical contact between the active substances when the particles are powdered, and the $SiO_x$ particles comprise Si microcrystals. Such a structure is also very helpful for improving the performance of the silicon oxide/carbon composite negative electrode material, and the distribution of the particle size of the $SiO_x$ particles is suitable. The capacity and the first coulomb efficiency of the product of embodiments 1~6 are high, and the rate performance and cycle stability are excellent.

In embodiment 7, the D50 of the $SiO_x$ particles is too large, the granulation effect is poor, and the electrical contact among the particles is bad, and in the charge-discharge process, larger particles easily result in the circumstance that the particles are broken due to the internal stress of lithium intercalation/deintercalation and the active substance is naked, and thus the cycle performance of the product in embodiment 7 is lowered compared with the products in embodiments 1~6, and the rate performance is also affected disadvantageously.

In embodiment 8, the D50 of the $SiO_x$ particles is too small, so that the material has a relatively large specific surface area and a larger proportion of silicon dioxide may be produced on the surface of the particles, and then loss of battery capacity is rendered when it is used as a negative electrode material, in addition, a too large specific surface area will cause uneven distribution of the carbonaceous binder during the granulation process, the conductivity among particles is weakened, and the capacity play of the material is further affected, and thus the rate performance and the cycle performance of the product in embodiment 8 are lowered compared with those of the products in embodiments 1~6.

In embodiment 9, the D50 of the $SiO_x$ particles is too large, and the particles with a particle size below 1.0 μm are also too few, which renders more obvious descending of the rate performance and the cycle performance.

In embodiment 10, the D50 of the $SiO_x$ particles is too small, and the particles with a particle size below 1.0 μm are also too many, which renders more secondary reactions and thus lowers the first efficiency of capacity, and the rate performance and the cycle performance are also lowered.

The comparative embodiment 1 does not adopt the solution of the present disclosure, and the $SiO_x$ particles in the product structure do not comprise Si microcrystals. Therefore, the electrochemical performance of the product is lowered.

The applicant declares that the present disclosure uses the above embodiments to illustrate the detailed methods of the present disclosure, but the present disclosure is not limited to the above detailed methods, that is, this does not mean that the present disclosure can only be implemented depending on the above detailed methods.

What is claimed is:

1. A silicon oxide/carbon composite negative electrode material, wherein the silicon oxide/carbon composite negative electrode material is of a secondary particle, mainly composed of a $SiO_x/C$ material, wherein the $SiO_x/C$ material comprises a $SiO_x$ particle and a carbon layer coated on a surface of the $SiO_x$ particle, wherein the $SiO_x$ particle comprises Si microcrystals, wherein a D50 of the $SiO_x$ particle is 0.5 μm<D50<3.0 μm, and wherein a D90 of the $SiO_x$ particle is D90<10 μm and a volume of the $SiO_x$ particle having a particle size below 1.0 μm comprises 25%-60% of a total volume of the $SiO_x$ particle.

2. The silicon oxide/carbon composite negative electrode material according to claim 1, wherein in the $SiO_x$ particle, $0.9 \leq x \leq 1.2$.

3. The silicon oxide/carbon composite negative electrode material according to claim 1, wherein a D50 of the $SiO_x/C$ material is 2-10 times of a D50 of the $SiO_x$ particle.

4. The silicon oxide/carbon composite negative electrode material according to claim 3, wherein a grain size of the Si microcrystals is 1.0-10 nm.

5. The silicon oxide/carbon composite negative electrode material according to claim 3, wherein in the silicon oxide/carbon composite negative electrode material, a mass fraction of carbon is 3-15 wt %.

6. The silicon oxide/carbon composite negative electrode material according to claim 1, wherein the silicon oxide/carbon composite negative electrode material has a porosity of 1%-25%.

7. The silicon oxide/carbon composite negative electrode material according to claim 6, wherein the silicon oxide/carbon composite negative electrode material has a specific surface area of 1.0-10.0 m²/g.

8. The silicon oxide/carbon composite negative electrode material according to claim 6, wherein the silicon oxide/carbon composite negative electrode material has a D50 of 2.0-45.0 μm.

9. The silicon oxide/carbon composite negative electrode material according to claim 6, wherein the silicon oxide/carbon composite negative electrode material has a compacted density of 1.0-2.0 g/cm³.

10. A method for preparing the silicon oxide/carbon composite negative electrode material according to claim 1, wherein the method comprises the following steps:
(1) compounding a silicon oxide;
(2) crushing the silicon oxide in step (1), to obtain micro-level and nano-level $SiO_x$ particles;
(3) mixing the micro-level and nano-level $SiO_x$ particles in step (2) with a carbonaceous binder, to obtain a precursor I;

(4) granulating, under a non-oxidizing atmosphere, the precursor I in step (3), to obtain a precursor II;

(5) modifying and carbonizing, under a non-oxidizing atmosphere, the precursor II in step (4), to obtain a precursor III; and (6) performing post-processing to the precursor III in step (5), to obtain the silicon oxide/carbon composite negative electrode material.

11. The method according to claim 10, wherein a chemical formula of a block of the silicon oxide in step (1) is $SiO_y$, wherein $0.9 \leq y < 1.1$.

12. The method according to claim 11, wherein a method for compounding the silicon oxide in the step (1) comprises: heating a mixture of metal silicon and silicon dioxide under a protective gas, and after sufficient reaction, condensing and depositing a resultant, to obtain the silicon oxide.

13. The method according to claim 12, wherein the protective gas comprises any one of nitrogen, helium, neon, argon, krypton and xenon, or a combination of at least two therefrom.

14. The method according to claim 10, wherein in a mixture of metal silicon and silicon dioxide, a molar ratio of metal silicon to silicon dioxide is 1:3-5:1.

15. The method according to claim 10, wherein the carbonaceous binder in the step (3) comprises any one of sugars, esters, hydrocarbons, organic acids and high molecular polymers, or a combination of at least two therefrom.

16. The method according to claim 10, wherein in the step (5), the non-oxidizing atmosphere comprises any one of nitrogen atmosphere, helium atmosphere, neon atmosphere, argon atmosphere, krypton atmosphere, xenon atmosphere and hydrogen atmosphere, or a combination of at least two therefrom, and any one of nitrogen atmosphere, helium atmosphere, argon atmosphere and hydrogen atmosphere, or a combination of at least two therefrom.

17. The method according to claim 10, wherein the method comprises the following steps:

(1) heating, under a protective gas, a mixture of metal silicon and silicon dioxide at a pressure of 0.1-50 Pa at 1000-1500° C., and condensing and depositing a resultant, to obtain the silicon oxide, wherein a chemical formula of the silicon oxide is $SiO_y$, wherein $0.9 \leq y < 1.1$; and in the mixture of metal silicon and silicon dioxide, a molar ratio of metal silicon to silicon dioxide is 1:3-5:1;

(2) crushing the silicon oxide in the step (1), to obtain micro-level and nano-level $SiO_x$ particles, wherein $0.9 \leq x \leq 1.2$; and a volume of the micro-level and nano-level $SiO_x$ particles whose particle size is below 1.0 μm comprises 25%-60% of a total volume of the micro-level and nano-level $SiO_x$ particles, a D50 of the micro-level and nano-level $SiO_x$ particles is 0.5 μm<D50<3.0 μm, and D90<10 μm;

(3) mixing the micro-level and nano-level $SiO_x$ particles in step (2) with a carbonaceous binder, to obtain the precursor I, wherein a mass ratio of the carbonaceous binder to the micro-level and nano-level $SiO_x$ particles is 5:95-30:70;

(4) raising, under a non-oxidizing atmosphere with a gas flow rate of 10-100.0 L/min, a temperature to 200-900° C. at a heating rate of 0.5-10° C./min and granulating the precursor I described in the step (3), to obtain the Precursor II;

(5) raising, under a non-oxidizing atmosphere with a gas flow rate of 10-100.0 L/min, a temperature to 700-1500° C. at a heating rate of 1.0-15° C./min and modifying and carbonizing the precursor II in the step (4), wherein a duration for the modifying and carbonizing is 2-6 h, to obtain the precursor III; and (6) screening, demagnetizing and drying the precursor III in the step (5), to obtain the silicon oxide/carbon composite negative electrode material.

18. A lithium-ion battery, wherein the lithium-ion battery comprises the silicon oxide/carbon composite negative electrode material according to claim 1.

* * * * *